(12) United States Patent
Huang et al.

(10) Patent No.: US 12,110,575 B2
(45) Date of Patent: Oct. 8, 2024

(54) HIGH STRENGTH AND TOUGHNESS DIE-CASTING ALUMINUM ALLOY WITHOUT HEAT TREATMENT, PREPARATION METHOD AND ARTICLE THEREOF

(71) Applicants: GUANGDONG HONGTU AUTO PARTS CO., LTD, Guangzhou (CN); GUANGDONG HONGTU TECHNOLOGY (HOLDINGS) CO., LTD, Zhaoqing (CN)

(72) Inventors: Hua Huang, Zhaoqing (CN); Yu Zhu, Zhaoqing (CN); Feng Yan, Zhaoqing (CN); Yun Lin, Zhaoqing (CN); Li Wan, Zhaoqing (CN)

(73) Assignees: GUANGDONG HONGTU AUTO PARTS CO., LTD, Guangzhou (CN); GUANGDONG HONGTU TECHNOLOGY (HOLDINGS) CO., LTD, Zhaoqing (CN)

( * ) Notice: Subject to any disclaimer, the term of this patent is extended or adjusted under 35 U.S.C. 154(b) by 0 days.

(21) Appl. No.: 18/233,911

(22) Filed: Aug. 15, 2023

(65) Prior Publication Data
US 2024/0301535 A1    Sep. 12, 2024

(30) Foreign Application Priority Data
Mar. 9, 2023  (CN) .......................... 202310223358.X

(51) Int. Cl.
| | | |
|---|---|---|
| C22C 21/02 | (2006.01) | |
| B22D 17/00 | (2006.01) | |
| B22D 21/00 | (2006.01) | |
| C22C 1/02 | (2006.01) | |

(52) U.S. Cl.
CPC .............. *C22C 21/02* (2013.01); *B22D 17/00* (2013.01); *B22D 21/007* (2013.01); *C22C 1/026* (2013.01)

(58) Field of Classification Search
CPC ......... C22C 21/02; C22C 21/04; C22C 1/026; C22F 1/043
See application file for complete search history.

(56) References Cited

U.S. PATENT DOCUMENTS

| | | |
|---|---|---|
| 6,364,970 B1 | 4/2002 | Hielscher et al. |
| 2016/0250683 A1* | 9/2016 | Wang ................... C22C 21/18 |
| | | 420/532 |
| 2017/0107599 A1* | 4/2017 | Wang ................... C22C 21/02 |

FOREIGN PATENT DOCUMENTS

| | | | |
|---|---|---|---|
| CN | 105441737 A | 3/2016 | |
| CN | 109881056 A | 6/2019 | |
| CN | 110079712 A | 8/2019 | |
| CN | 110760721 A | 2/2020 | |
| CN | 111139381 A | 5/2020 | |
| CN | 111455228 A | 7/2020 | |
| CN | 113755722 A | 12/2021 | |
| CN | 114411020 A | 4/2022 | |
| CN | 114717455 A | 7/2022 | |
| CN | 115074584 A | 9/2022 | |
| CN | 115198149 A | 10/2022 | |
| GB | 2570026 A | * 7/2019 | ............. C22C 21/00 |

* cited by examiner

*Primary Examiner* — Jessee R Roe
(74) *Attorney, Agent, or Firm* — JCIPRNET

(57) ABSTRACT

A high strength and toughness die-casting aluminum alloy without heat treatment, a preparation method and an article thereof are provided. Aluminum alloy includes the following components in percentage by mass: 7.0-10.0 wt. % of silicon, not more than 0.05 wt. % of copper, not more than 0.4 wt. % of magnesium, 0.3-0.7 wt. % of manganese, not more than 0.2 wt. % of iron, not more than 0.07 wt. % of zinc, not more than 0.2 wt. % of titanium, 0.015-0.03 wt. % of strontium, 0.01-0.1 wt. % of vanadium, 0.01-0.1 wt. % of zirconium, and other unavoidable impurity elements, each not more than 0.05 wt. %. The total amount of other unavoidable impurity elements is not more than 0.25 wt. %, and the rest is aluminum.

20 Claims, 4 Drawing Sheets

HIGH STRENGTH AND TOUGHNESS DIE-CASTING ALUMINUM ALLOY WITHOUT HEAT TREATMENT, PREPARATION METHOD AND ARTICLE THEREOF

CROSS REFERENCE TO THE RELATED APPLICATIONS

This application is based upon and claims priority to Chinese Patent Application No. 202310223358.X, filed on Mar. 9, 2023, the entire contents of which are incorporated herein by reference.

TECHNICAL FIELD

The present invention belongs to the field of aluminum alloy technology, and specifically relates to a high strength and toughness die-casting aluminum alloy without heat treatment, a preparation method and an article thereof.

BACKGROUND

Aluminum and aluminum alloys have the characteristics of low density, high specific strength, good plasticity, excellent mechanical properties, low coefficient of thermal expansion, good corrosion resistance, excellent conductivity and thermal conductivity, easy processing, and recyclability. They have been widely used in aviation, aerospace, automotive, mechanical manufacturing, shipbuilding, chemical industry, and packaging. They have become the most widely used category of non-ferrous metal materials in modern industry (especially in the automotive industry), and are also green, environmentally friendly, and sustainable non-ferrous metal materials. With the development of the automotive manufacturing industry, higher requirements have been put forward for the performance of aluminum alloy materials. Developing new aluminum alloys with high strength, high plasticity, high toughness, and good processing and manufacturing performance is of great research significance.

In existing technology, traditional die-casting aluminum alloys mainly use ADC12 and A380 aluminum alloy grades as raw materials. Although they have high strength, their elongation is low and cannot meet the mechanical performance requirements of structural parts. Meanwhile, traditional ordinary die-casting has air holes due to its tendency to curl up, which can cause bubbles when heated, making it difficult to optimize the performance of ordinary die-casting castings through heat treatment. Therefore, the performance of traditional die-casting is limited, often only suitable for functional castings such as die-casting chain covers and oil pans, and cannot produce high-performance castings.

With the improvement of die-casting technology and equipment, high vacuum die-casting technology has been developed in the field of casting, which solves the problem of gas entrapment caused by alloy liquid during the filling process of the mold cavity. Therefore, castings produced by high vacuum die-casting can achieve better performance through heat treatment processes. In terms of corresponding materials, the Silafont 36 alloy that can be heat treated and strengthened, namely AlSi10MnMg aluminum alloy (Patent Publication Number: U.S. Pat. No. 6,364,970B1), is widely used for structural castings with certain mechanical properties requirements in die casting, such as shock absorption towers and longitudinal beams.

In the context of dual carbon, lightweight is a major trend in the development of the automotive industry. Among them, integrated die-casting has become an important approach to achieve lightweight in automobiles. For example, the Tesla Model Y rear floor assembly has reduced its weight by 30% after adopting integrated die-casting. Although Silafont 36 alloy exhibits high strength and toughness after heat treatment, large-sized castings are prone to deformation during the heat treatment process, making it unsuitable for integrated die casting. The development of integrated die-casting has put forward a demand for materials without heat treatment, which are aluminum alloy materials with high strength and toughness mechanical properties in the as-cast state.

At present, multiple domestic enterprises and research institutions have publicly disclosed some aluminum alloy materials without heat treatment that can be used for integrated die casting, such as CN 114411020 A and CN 109881056 A from Shanghai Jiao Tong University. These patents not only add common elements such as Si, Mg, and Mn, but also use rare earth elements as strengthening elements to ensure the high strength and toughness of aluminum alloys. However, due to the high price of rare earth elements, it makes the production cost of high strength and toughness aluminum alloys, which originally had high requirements for melting quality, even more expensive. Similarly, Tsinghua University has conducted related research on two types of aluminum alloys, named THAS-1 (Application Publication Number CN 110079712 A) and THAS-2 (Application Publication Number CN 111455228 A), which have higher strength. However, from the examples, the aluminum liquid used for performance testing was obtained from a small batch melting of 2 kg, and the test bars used were round bars. The performance of the plate samples taken from the product was unknown. CN111139381 A of Baoding Longda Aluminum Industry Co., Ltd. (affiliated to Lizhong Group) controls too many impurity element contents, which makes it difficult to control the quality of aluminum liquid produced in large batch and continuous production, and restricts the use of return charge to some extent.

SUMMARY

In response to one or more of the above-mentioned defects or improvement requirements of the existing technology, the present invention provides a high strength and toughness die-casting aluminum alloy without heat treatment and a preparation method and an article thereof. The aluminum alloy prepared by the present invention not only has high strength and toughness mechanical properties, but also has good flowability. The aluminum liquid can smoothly fill the mold cavity under pressure, thereby ensuring the forming quality of large die-casting parts to realize large-scale continuous production.

To achieve the above-mentioned purposes, the present invention provides a high strength and toughness die-casting aluminum alloy without heat treatment, which comprises the following components in percentage by mass: 7.0-10.0 wt. % of silicon, no more than 0.05 wt. % of copper, no more than 0.4 wt. % of magnesium, 0.3-0.7 wt. % of manganese, no more than 0.2 wt. % of iron, no more than 0.07 wt. % of zinc, no more than 0.2 wt. % of titanium, 0.015-0.03 wt. % of strontium, 0.01-0.1 wt. % of vanadium, and 0.01-0.1 wt. % of zirconium. Each of the other unavoidable impurity elements is no more than 0.05 wt. %, and the sum of the other unavoidable impurity elements is no more than 0.25 wt. %, and the rest is aluminum.

As a further preference of the present invention, the aluminum alloy comprises the following components in percentage by mass: 8.5-9.5 wt. % of silicon, no more than 0.05 wt. % of copper, 0.2-0.3 wt. % of magnesium, 0.45-0.55 wt. % of manganese, no more than 0.2 wt. % of iron, no more than 0.07 wt. % of zinc, no more than 0.2 wt. % of titanium, 0.015-0.03 wt. % of strontium, 0.02-0.05 wt. % of vanadium, 0.01-0.05 wt. % of zirconium. Each of the other unavoidable impurity elements is no more than 0.05 wt. %, and the sum of the other unavoidable impurity elements is no more than 0.25 wt. %, and the rest is aluminum.

As a further preference of the present invention, the aluminum alloy comprises the following components in percentage by mass: 8.5-9.5 wt. % of silicon, no more than 0.05 wt. % of copper, 0.1 wt. % of magnesium, 0.45-0.55 wt. % of manganese, no more than 0.2 wt. % of iron, no more than 0.07 wt. % of zinc, no more than 0.2 wt. % of titanium, 0.015-0.03 wt. % of strontium, 0.02-0.05 wt. % of vanadium, 0.01-0.05 wt. % of zirconium. Each of the other unavoidable impurity elements is no more than 0.05 wt. %, and the sum of the other unavoidable impurity elements is no more than 0.25 wt. %, and the rest is aluminum.

As a further preference of the present invention, the ratio of the percentage by mass of the vanadium to that of the zirconium is 1.2:1 to 2.4:1.

In addition, the present invention also provides a method for preparing a high strength and toughness die-casting aluminum alloy without heat treatment, comprising the following steps:

S1. weighing aluminum raw material, silicon raw material, magnesium raw material, Al—Mn intermediate alloy, Al—V intermediate alloy, Al—Zr intermediate alloy, Al—Sr intermediate alloy, and Al—Ti—B intermediate alloy according to the weight ratio;

S2. adding the weighed metal raw materials in batches to a smelting furnace for melting to obtain a molten aluminum liquid;

S3. after all the metals in the molten aluminum liquid have melted, allowing the molten aluminum liquid to stand still and analyzing whether its chemical composition meets the requirements; if so, proceeding to step S5; if not, proceeding to step S4;

S4. determining the composition adjustment plan and materials based on the analysis of the chemical composition, and then proceeding to step S2;

S5. conducting a preliminary refinement of the molten aluminum liquid and injecting the preliminarily refined molten aluminum liquid into a transfer ladle;

S6. conducting a secondary refinement of the preliminarily refined molten aluminum liquid in the transfer ladle, and adding an Al—Ti—B intermediate alloy in the powder state to obtain the refined aluminum liquid;

S7. conducting quality testing on the refined aluminum liquid to determine whether it meets the quality requirements; if so, proceeding to step S9; if not, proceeding to step S8;

S8. determining the quality adjustment plan and materials based on the quality testing, and then proceeding to step S2;

S9. injecting the refined aluminum liquid into a die-casting machine for die-casting to obtain a high strength and toughness die-casting aluminum alloy product without heat treatment and a primary return charge.

As a further preference of the present invention, wherein the S2 comprises the following steps:

S21. adding the aluminum raw material to the smelting furnace, then raising the temperature in the smelting furnace to 680° C., and maintaining the temperature in the smelting furnace until all the aluminum raw materials are melted;

S22. raising the temperature in the smelting furnace to 720° C.-750° C., then adding silicon raw material, Al—Mn intermediate alloy, Al—V intermediate alloy, Al—Zr intermediate alloy, and Al—Sr intermediate alloy, and maintaining the temperature in the smelting furnace until all the intermediate alloy and silicon raw material are melted;

S23. reducing the temperature in the smelting furnace to 700° C.-730° C., then pressing the magnesium raw material into the melt and maintaining the temperature in the smelting furnace until the magnesium raw material is completely melted.

As a further preference of the present invention, wherein the aluminum raw material is one or more of pure aluminum or aluminum ingots with a quality not lower than Al99.80 grade for remelting, and/or the silicon raw material is one or more of pure silicon or industrial silicon with a quality not lower than Si4410 grade.

As a further preference of the present invention, wherein in the S2, the primary return charge that does not exceed 30% of the total aluminum demand weight is added.

As a further preference of the present invention, wherein in the S9, the refined aluminum liquid in the transfer ladle is transferred to a holding furnace located on one side of the die-casting machine for insulation.

In addition, the present invention further discloses a high strength and toughness die-casting aluminum alloy article without heat treatment, wherein the aluminum alloy article has the high strength and toughness die-casting aluminum alloy without heat treatment; or the aluminum alloy article has the high strength and toughness die-casting aluminum alloy without heat treatment prepared by the above-mentioned method for preparing the high strength and toughness die-casting aluminum alloy without heat treatment; or at least a portion of the aluminum alloy article is obtained by reprocessing the high strength and toughness die-casting aluminum alloy without heat treatment; or at least a portion of the aluminum alloy article is obtained by reprocessing the high strength and toughness die-casting aluminum alloy without heat treatment prepared by the above-mentioned method for preparing the high strength and toughness die-casting aluminum alloy without heat treatment.

The above-mentioned technical features can be combined with each other as long as they do not conflict with each other.

In sum, the above-mentioned technical solutions conceived by the present invention have beneficial effects compared to existing technologies, including:

(1) the present invention relates to a high strength and toughness die-casting aluminum alloy without heat treatment, which ensures excellent flowability of the aluminum liquid and better elongation of the aluminum alloy material by using 7.0-10.0 wt. % silicon, ensuring that the aluminum alloy liquid is able to quickly, smoothly, and accurately fill the cavity of the die-casting machine, thereby ensuring the molding quality of the die-casting. Balancing the demand for demolding and high toughness of aluminum alloy castings by reducing the proportion of iron element and correspondingly increasing the content of manganese element. Moreover, in order to improve the yield strength of aluminum alloy materials, magnesium element with a mass ratio of no more than 0.4 wt. % is added, resulting in a yield strength of aluminum alloy materials of above 120 MPa; Meanwhile, by adding vanadium element with a percentage by mass of 0.01-0.1 wt. % and zirconium element with a percentage by mass of 0.01-0.1 wt. %, which is used for refining pre-crystallization, it is further ensured that the aluminum alloy material has a higher structural strength and also has good elongation. Strontium element with a percentage by mass of 0.015-0.03 wt. % is added as a modifier to refine the eutectic silicon structure, thereby ensuring the structural strength of the high-strength and tough aluminum alloy material.

(2) the present invention relates to a high strength and toughness die-casting aluminum alloy without heat treatment, which can pass small-scale integrated rear floor trial production and meet the performance requirements of automotive chassis structural parts in areas with good filling performance. It may be applied to the production of integrated rear floor, front cabin, battery tray and other structural parts. Moreover, it has passed the performance verification of the integrated rear floor parts. In the well filled area, the tensile strength of the body sampling reaches 277 MPa, the yield strength reaches 130 MPa, and the elongation reaches 11.7%. The performance meets the structural requirements, while the performance test results of sampling at different positions are stable. At the same time, through the performance verification of the shock absorber parts, the mechanical properties and connection performance meet the standards. The shock absorber cast using the aluminum alloy of the present invention meets the assembly requirements and passes the collision verification test.

(3) the present invention relates to a high strength and toughness die-casting aluminum alloy without heat treatment; as to the prepared aluminum alloy material, α-Al has an average grain size of no more than 20 μm and silicon phase has an average grain size of no more than 1 μm. According to the principle of fine grain strengthening, the finer the grain size, the strength and toughness of the material can be simultaneously enhanced. The fine grain size of the aluminum alloy of the present invention is a key factor for promoting its high strength and toughness performance.

(4) the present invention relates to a method for preparing a high strength and toughness die-casting aluminum alloy without heat treatment, by reusing the primary return charge formed through die-casting in the die-casting machine during the next melting process, it achieves the same level of recycling of high-performance aluminum alloy casting return charge, can significantly improve material utilization efficiency, lowers preparation costs, reducing the demand for electrolytic aluminum, achieves energy conservation and environmental protection, and this is of great significance for reducing energy consumption in the die-casting industry chain and reducing carbon emissions.

(5) the present invention relates to a high strength and toughness die-casting aluminum alloy without heat treatment, and a preparation method and article thereof. The material performance is excellent, and the preparation process is convenient. By accurately designing the composition of the aluminum alloy material, the prepared aluminum alloy can have a good balance in strength, elongation, flowability and so on, and its comprehensive performance is superior to existing die-casting aluminum alloy materials. The aluminum alloy castings produced by the present invention can avoid deformation caused by the heat treatment process, not only reducing the scrap rate of casting products, but also saving energy consumption during the heat treatment, thereby achieving the effects of energy conservation and emission reduction. By using the same level recycling of the primary return charge, the utilization rate of the material is improved, and the production cost is further reduced, which has excellent economic benefits and promotion value.

DETAILED DESCRIPTION OF THE EMBODIMENTS

In order to make the purpose, technical solution, and advantages of the present invention clearer, the following will provide a further detailed explanation of the present invention in conjunction with the accompanying drawings and embodiments. It should be understood that the specific embodiments described herein are only intended to explain the present invention and are not intended to limit it. In addition, the technical features involved in the various embodiments of the present invention described below can be combined with each other as long as they do not conflict with each other.

In a preferred embodiment of the present application, the high-strength and ductile die-casting aluminum alloy without heat treatment and its preparation method and articles can achieve large-scale mass production, and the prepared aluminum alloy not only has high strength and toughness mechanical properties, but also has good flowability so as to ensure that the aluminum liquid can smoothly fill the mold cavity under pressure, ensuring the forming quality of large die-casting parts. Furthermore, it can achieve the reuse of return charges during the die-casting process, thereby improving the efficiency of raw material utilization.

Specifically, in a preferred embodiment of the present application, the high strength and toughness die-casting aluminum alloy without heat treatment comprises the following components in percentage by mass: 7.0-10.0 wt. % of silicon, no more than 0.05 wt. % of copper, no more than 0.4 wt. % of magnesium, 0.3-0.7 wt. % of manganese, no more than 0.2 wt. % of iron, no more than 0.07 wt. % of zinc, no more than 0.2 wt. % of titanium, 0.015-0.03 wt. % of strontium, 0.01-0.1 wt. % of vanadium, and 0.01-0.1 wt. % of zirconium. Each of the other unavoidable impurity elements is no more than 0.05 wt. %, and the sum of the other unavoidable impurity elements is no more than 0.25 wt. %, and the rest is aluminum.

Figure 1:
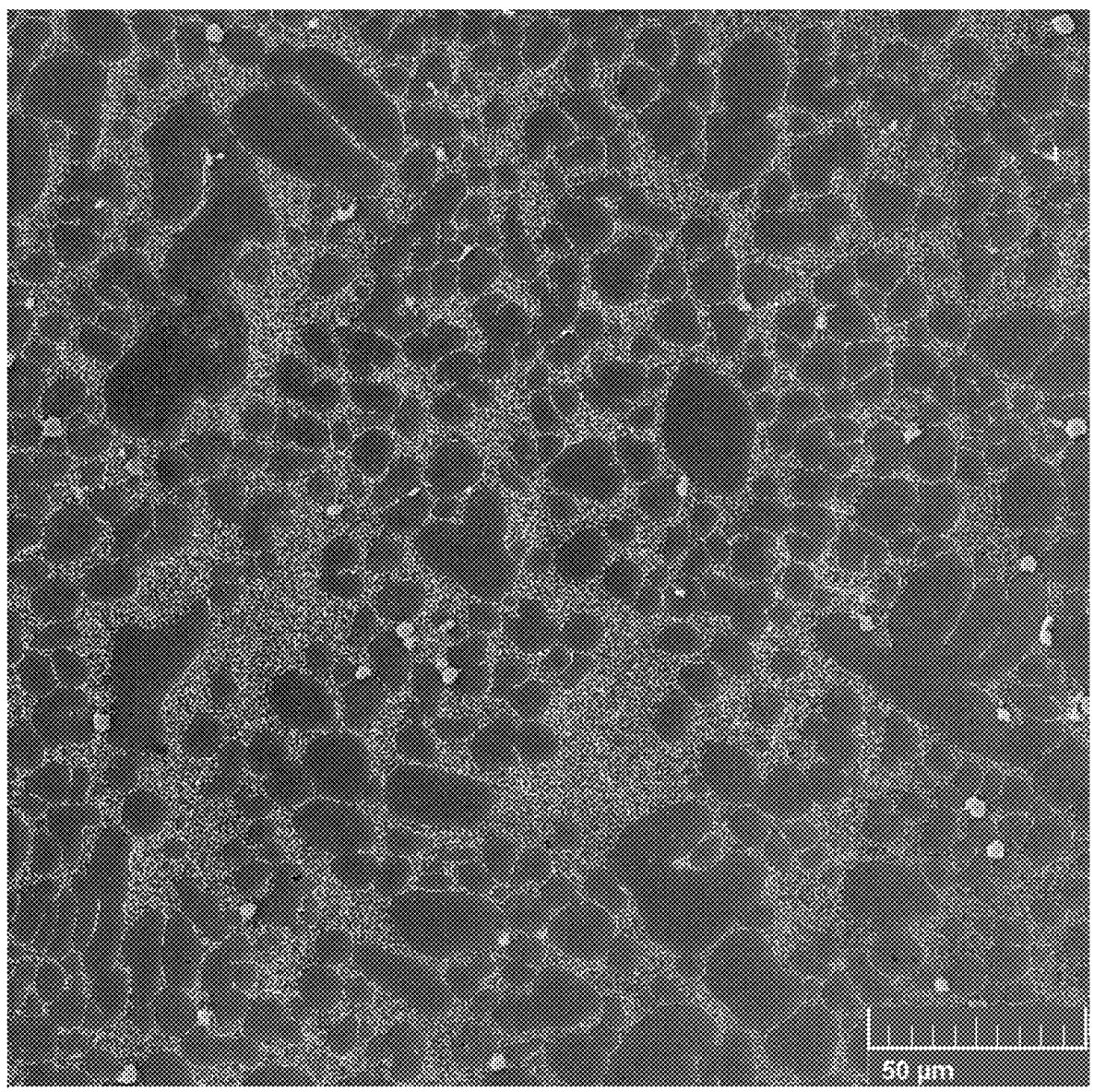
FIG. 1 is a scanning electron microscope image of a sample prepared according to Example 1 of a high strength and toughness die-casting aluminum alloy without heat treatment in the present invention under a 1 k magnification field of view.
Figure 2:
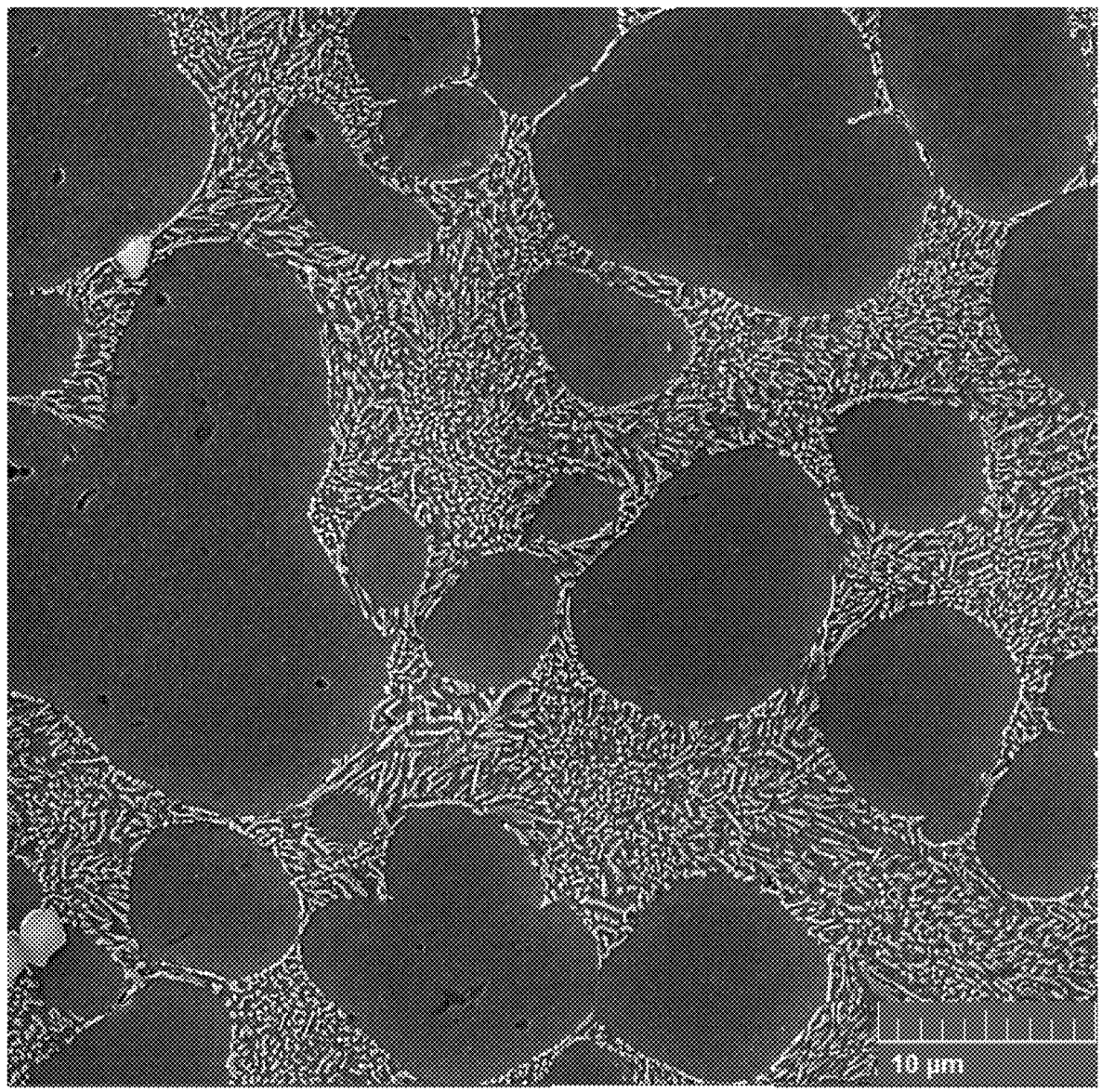
FIG. 2 is a scanning electron microscope image of a sample prepared according to Example 1 of a high strength and toughness die-casting aluminum alloy without heat treatment in the present invention under a 5 k magnification field of view.
Figure 3:
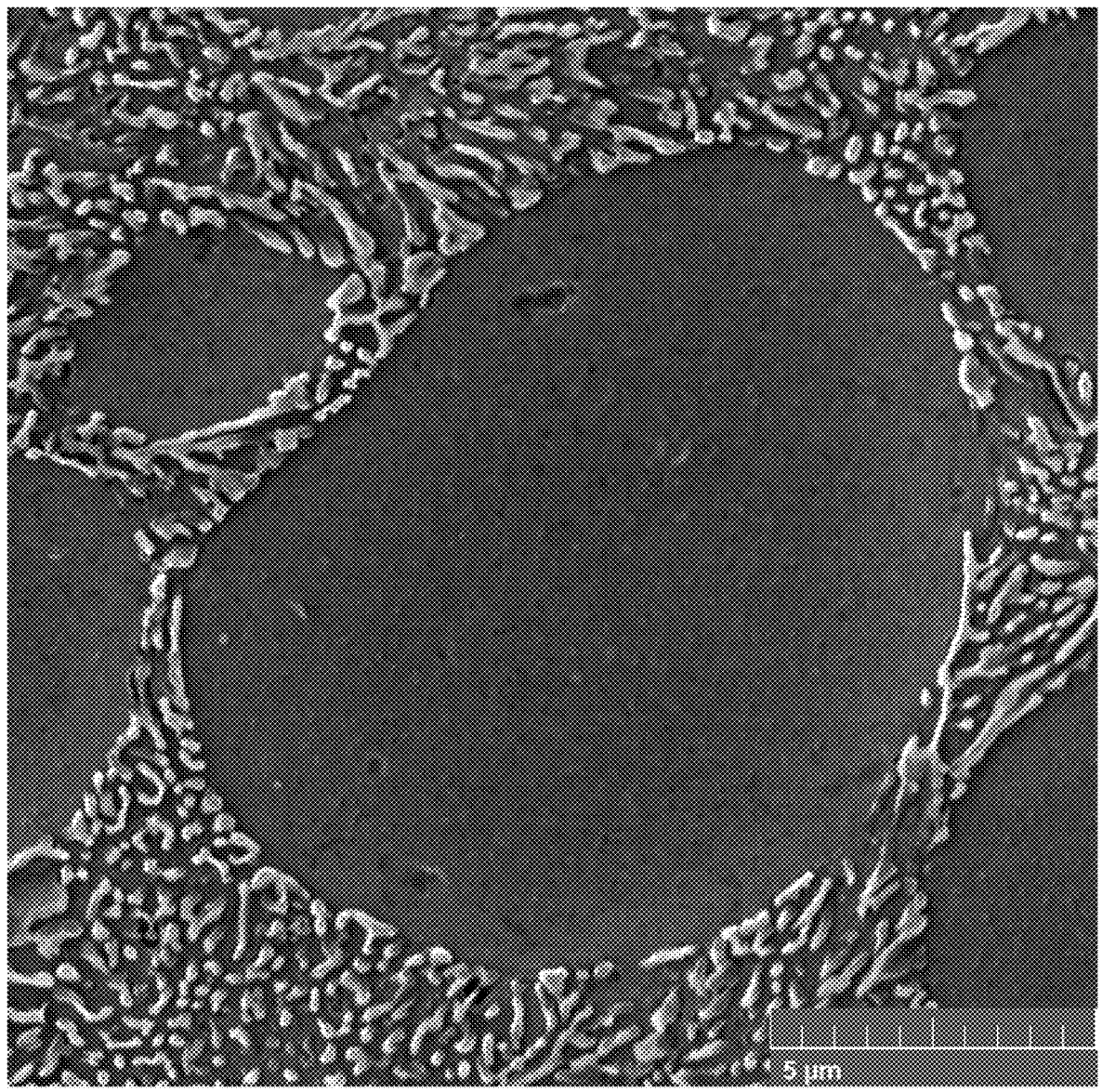
FIG. 3 is a scanning electron microscope image of a sample prepared according to Example 1 of a high strength and toughness die-casting aluminum alloy without heat treatment in the present invention under a 15 k magnification field of view.

More specifically, among the components of the above-mentioned high strength and toughness die-casting aluminum alloy without heat treatment, the actual addition amount of silicon element is relatively less than that of materials such as AlSi10MnMg. Its weight ratio is controlled in the range of 7.0-10.0 wt. %, ensuring excellent fluidity of the aluminum liquid and better elongation of the aluminum alloy material. In practical use, it ensures that the melted aluminum alloy liquid can be quickly, smoothly and accurately fill the cavity of the die casting machine to further ensure the molding quality of the die casting. Moreover, due to the formation of needle like structures of iron elements in aluminum alloys, cleavage of α-Al grains cause a decrease in the toughness of aluminum alloy materials. Therefore, in order to ensure the toughness of aluminum alloy materials, in a preferred embodiment of the present application, the percentage by mass of iron element is controlled to be no more than 0.2 wt. %, and manganese element with a percentage by mass of 0.3-0.7 wt. % is added accordingly, thereby ensuring the smooth demolding of aluminum alloy materials after die casting. Meanwhile, in order to improve the yield strength of aluminum alloy materials, in a preferred embodiment of the present application, magnesium element with a mass ratio of no more than 0.4 wt. % is added, so that the yield strength of the aluminum alloy material is above 120 MPa, ensuring that the die casting meets the yield strength requirements. In addition, in a preferred embodiment of the present application, vanadium element with a percentage by mass of 0.01-0.1 wt. % and zirconium element with a percentage by mass of 0.01-0.1 wt. % are added to the aluminum alloy to refine pre-crystallization, further ensuring that the aluminum alloy material has a higher structural strength and also has a good elongation. Strontium element with a percentage by mass of 0.015-0.03 wt. % is added as a modifier to refine the eutectic silicon structure, further enhancing the structural strength of the aluminum alloy material. As shown in FIGS. 1 to 3, the high strength and toughness die-casting aluminum alloy without heat treatment prepared from the above-mentioned components has an α-Al with the average grain size of no more than 20 μm and a silicon phase with the average grain size of no more than 1 μm. The finer grain size enables this high strength and toughness die-casting aluminum alloy without heat treatment to possess both higher strength and toughness.

Furthermore, in a preferred embodiment of the present application, the high strength and toughness die-casting aluminum alloy without heat treatment comprises the following components in percentage by mass: 8.5-9.5 wt. % of silicon, no more than 0.05 wt. % of copper, 0.2-0.3 wt. % of magnesium, 0.45-0.55 wt. % of manganese, no more than 0.2 wt. % of iron, no more than 0.07 wt. % of zinc, no more than 0.2 wt. % of titanium, 0.015-0.03 wt. % of strontium, 0.02-0.05 wt. % of vanadium, and 0.01-0.05 wt. % of zirconium. Each of the other unavoidable impurity elements is no more than 0.05 wt. %, and the sum of the other unavoidable impurity elements is no more than 0.25 wt. %, and the rest is aluminum. In this preferred embodiment, by controlling of silicon, copper, magnesium, manganese, iron, zinc, titanium, strontium, vanadium and zirconium in the heat free high strength and toughness die-casting aluminum alloy to be the above-mentioned contents, not only can the performance deterioration caused by iron element in the aluminum silicon alloy be significantly reduced, and the tendency of hot cracking of the mucosa be alleviated, but also the grain can be refined, and the mechanical properties of the alloy materials can be improved through solid solution strengthening, grain refinement strengthening and so on. Meanwhile, the alloy melt has good flowability and formability, allowing the silicon aluminum alloy obtained by die casting to achieve high strength and toughness without the need for subsequent heat treatment, and has a high qualification rate.

Further preferably, in another preferred embodiment of the present application, this high strength and toughness die-casting aluminum alloy without heat treatment comprises the following components in percentage by mass: 8.5-9.5 wt. % of silicon, no more than 0.05 wt. % of copper, no more than 0.1 wt. % of magnesium, 0.45-0.55 wt. % of manganese, no more than 0.2 wt. % of iron, no more than 0.07 wt. % of zinc, no more than 0.2 wt. % of titanium, 0.015-0.03 wt. % of strontium, 0.02-0.05 wt. % of vanadium, and 0.01-0.05 wt. % of zirconium. Each of the other unavoidable impurity elements is no more than 0.05 wt. %, and the sum of the other unavoidable impurity elements is no more than 0.25 wt. %, and the rest is aluminum. In this preferred embodiment, the percentage by mass of magnesium element used is no more than 0.1 wt. %, which can ensure the elongation of the high strength and toughness die-casting aluminum alloy without heat treatment.

Furthermore, in a preferred embodiment of the present application, in the high strength and toughness die-casting aluminum alloy without heat treatment, the percentage by mass of vanadium element is greater than that of zirconium element. Preferably, the ratio between the percentage by mass of vanadium element and that of zirconium element is 1.2:1 to 2.4:1.

Figure 4:
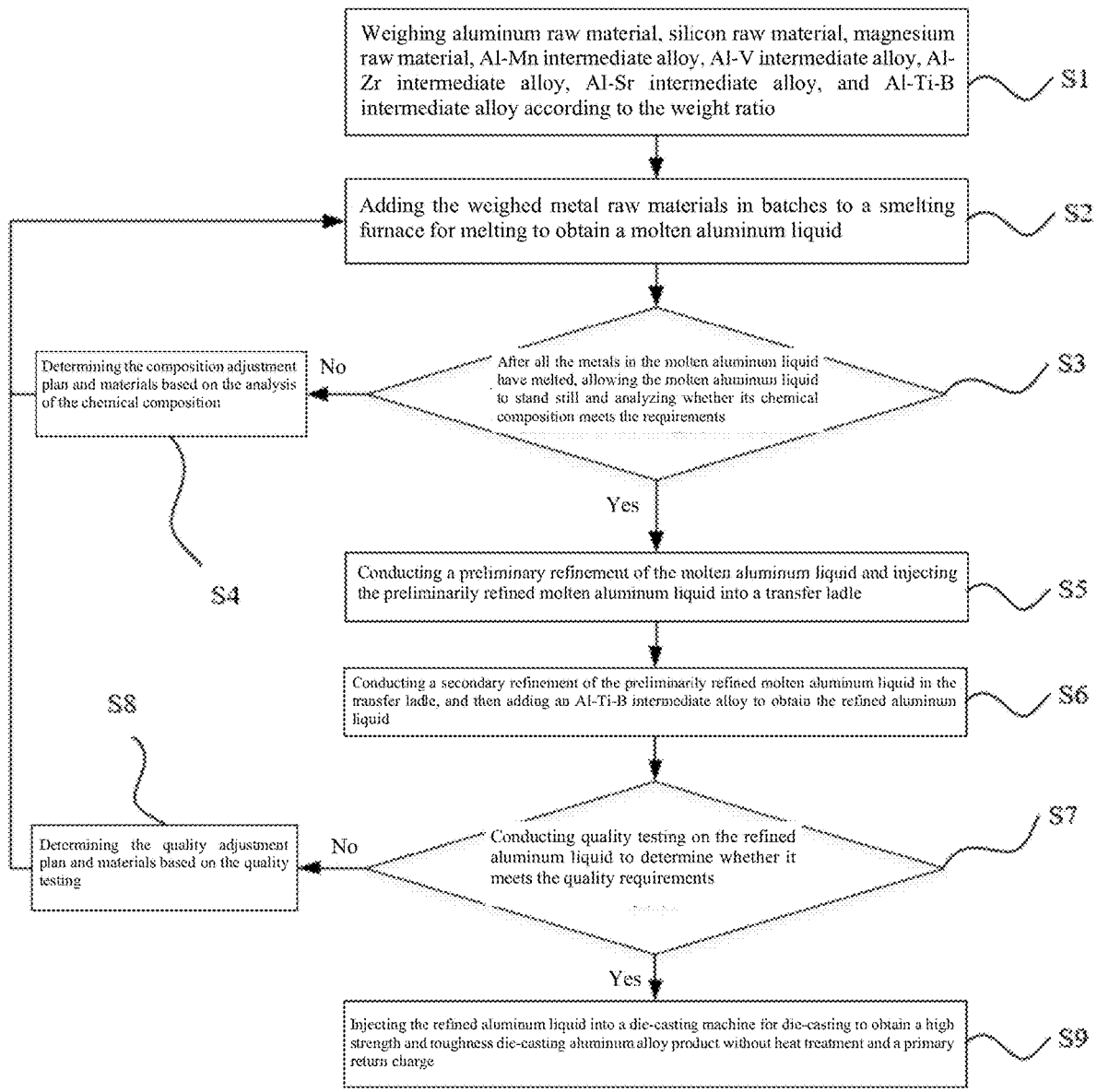
FIG. 4 is a flowchart of the method for preparing the high strength and toughness die-casting aluminum alloy without heat treatment of the present invention.

Furthermore, as shown in FIG. 4, the present application also discloses a method for preparing a high strength and toughness die-casting aluminum alloy without heat treatment, which comprises the following steps:

S1. weighing aluminum raw material, silicon raw material, magnesium raw material, Al—Mn intermediate alloy, Al—V intermediate alloy, Al—Zr intermediate alloy, Al—Sr intermediate alloy, and Al—Ti—B intermediate alloy according to the weight ratio;

Preferably, the aluminum raw material is pure aluminum (pure aluminum ingot or powder) or one or more of the aluminum ingots for remelting with a quality not lower than Al99.80 grade, and/or the silicon raw material is pure silicon or one or more of the industrial silicon with a quality not lower than Si4410 grade. Further preferably, pure magnesium ingots are used as the raw material for magnesium.

S2. adding the weighed metal raw materials in batches to a smelting furnace for melting to obtain a molten aluminum liquid;

Preferably, the S2 comprises the following steps:

S21. adding the aluminum raw material to the smelting furnace, then raising the temperature in the smelting furnace to 680° C., and maintaining the temperature in the smelting furnace until all the aluminum raw materials are melted;

S22. raising the temperature in the smelting furnace to 720° C.-750° C., then adding silicon raw material, Al—Mn intermediate alloy, Al—V intermediate alloy, Al—Zr intermediate alloy, and Al—Sr intermediate alloy, and maintaining the temperature in the smelting furnace until all the intermediate alloy and silicon raw material are melted;

S23. reducing the temperature in the smelting furnace to 700° C.-730° C., then pressing the magnesium raw material into the melt and maintaining the temperature in the smelting furnace until the magnesium raw material is completely melted.

S3. after all the metals in the molten aluminum liquid have melted, allowing the molten aluminum liquid to stand still and analyzing whether its chemical composition meets the requirements; if so, proceeding to step S5; if not, proceeding to step S4;

S4. determining the composition adjustment plan and materials based on the analysis of the chemical composition, and then proceeding to step S2;

S5. conducting a preliminary refinement of the molten aluminum liquid and injecting the preliminarily refined molten aluminum liquid into a transfer ladle;

S6. conducting a secondary refinement of the preliminarily refined molten aluminum liquid in the transfer ladle, and adding an Al—Ti—B intermediate alloy to obtain the refined aluminum liquid;

S7. conducting quality testing on the refined aluminum liquid to determine whether it meets the quality requirements; if so, proceeding to step S9; if not, proceeding to step S8;

Preferably, the quality testing includes chemical composition testing, density testing, and slag content testing, where the K-modulus value is no more than 0/20, i.e. the slag surface is zero.

S8. determining the quality adjustment plan and materials based on the quality testing, and then proceeding to step S2;

S9. injecting the refined aluminum liquid into a die-casting machine for die-casting to obtain a high strength and toughness die-casting aluminum alloy product without heat treatment and a primary return charge.

Preferably, the refined aluminum liquid in the transfer ladle is transferred to a holding furnace located on one side of the die-casting machine for insulation, and the temperature in the holding furnace is maintained between 680° C. to 700° C.

Further preferably, the inner gate speed is 40-60 m/s, the casting pressure is 60-80 MPa, the release agent ratio is 1:80, the mold temperature is 180-230° C., and the vacuum degree is above 30 mbar.

In addition, in a preferred embodiment of the present application, the primary refining and/or secondary refining operations are carried out by introducing gas and adding solid refining agents. Preferably, this gas is argon or nitrogen.

Furthermore, in the limited embodiment of the present application, the preliminary refining is as follows: a flow rate of 16-22 L/min is introduced with gas and a solid refining agent of 0.1-0.3% by weight of the melt is added, with a slag and gas removal time of 5-30 min. Subsequently, surface scum is removed, and the transfer ladle capacity is 1-1.5 T.

Correspondingly, in a preferred embodiment of the present application, the secondary refining is as follows: removing the surface scum of the aluminum liquid, adding 5 kg/ton of AlTi5B1 refining agent, pressing it into the melt and stirring it to melt. Subsequently, nitrogen and 150-200 g/ton of solid refining agent are introduced at a flow rate of 25-30 L/min, followed by a 5 min rotating refining process for slag and gas removal at a speed of 450-550 r/min. Subsequently, slag removal is carried out.

Further preferably, it may add a primary return charge that does not exceed 30% of the demand for aluminum ingots to S2 for the next preparation of high strength and toughness die-casting aluminum alloys. That is, in S2, a primary return charge that does not exceed 30% of the total aluminum demand weight is added, thereby achieving the reuse of the primary return charge generated after die-casting molding, improving the utilization rate of raw materials, and significantly reducing production costs. After testing, 70% of Al99.80 aluminum ingots (including intermediate alloys) and 30% of the primary return charge are used to produce test bars for aluminum liquid production. The as-cast tensile strength is still 270-300 MPa, yield strength is 120-150 MPa, and elongation is 11-16%, which is basically consistent with the performance of test bars cast entirely using Al99.80 aluminum ingot molten aluminum liquid. The high strength and toughness aluminum alloy waste of the present invention can be recycled in a large proportion at the same level, greatly reducing the use of pure aluminum ingots, thereby reducing the demand for electrolytic aluminum, energy conservation and environmental protection, and is of great significance for reducing energy consumption and carbon emissions in the die-casting industry chain.

Furthermore, in a preferred embodiment of the present application, a high strength and toughness die-casting aluminum alloy article without heat treatment is also disclosed. Specifically, the high strength and toughness die-casting aluminum alloy article without heat treatment has the above-mentioned high strength and toughness die-casting aluminum alloy; or the high strength and toughness die-casting aluminum alloy article without heat treatment has the high strength and toughness die-casting aluminum alloy without heat treatment prepared by the above-mentioned method for preparing the high strength and toughness die-casting aluminum alloy without heat treatment; or at least a portion of the high strength and toughness die-casting aluminum alloy article without heat treatment is obtained by reprocessing the above-mentioned high strength and toughness die-casting aluminum alloy without heat treatment; or at least a portion of the high strength and toughness die-casting aluminum alloy article without heat treatment is obtained by reprocessing the high strength and toughness die-casting aluminum alloy without heat treatment prepared by the above-mentioned method for preparing the high strength and toughness die-casting aluminum alloy without heat treatment.

More specifically, in a preferred embodiment of the present application, the aluminum alloy has undergone small-scale integrated rear floor trial production. In the well filled area, its performance meets the performance requirements of automotive chassis structural parts and can be applied to the production of integrated rear floor, front cabin, battery tray and other structural parts. Furthermore, it has passed the performance verification of the integrated rear floor parts. In the well filled area, the tensile strength of the body sampling is 270-300 MPa, the yield strength is 120-150 MPa, and the elongation is 12-17%. The performance meets the structural requirements, while the performance test results of sampling at different positions are stable. Applying it to large structural components can achieve one-time die-casting of the rear floor, merging more than 70 original parts into one, reducing stamping processes, increasing efficiency by 90%, and reducing product weight by 10%, meeting the lightweight demand of the automotive industry to replace steel with aluminum. Meanwhile, through the performance verification of the shock absorber parts, the mechanical properties and riveting performance meet the requirements, and the shock absorber cast using the aluminum alloy of the present invention meets the assembly requirements.

The following describes the present invention with reference to specific examples. It should be noted that these examples are only descriptive and do not limit the present invention in any way.

EXAMPLE 1

The percentage by weight of each component in the high strength and toughness die-casting aluminum alloy without heat treatment was: Silicon: 9.0 wt. %; Magnesium: 0.22 wt. %; Manganese: 0.5 wt. %; Titanium: 0.03 wt. %; Strontium: 0.022 wt. %; Vanadium: 0.024 wt. %; Zirconium: 0.014 wt. %, iron: 0.1 wt. %. Each of the other unavoidable impurity elements was no more than 0.05 wt. %, and the sum of the other unavoidable impurity elements was no more than 0.25 wt. %, and the rest was aluminum. The grade of the aluminum alloy prepared by using this component was HTDA02plus.

This method for preparing a high strength and toughness die-casting aluminum alloy without heat treatment comprised the following steps:

S1. Al99.80 aluminum ingot, Si4410 industrial silicon, pure magnesium ingot, Al—Mn intermediate alloy, Al—V intermediate alloy, Al—Zr intermediate alloy, Al—Sr intermediate alloy, and Al—Ti—B intermediate alloy were weighed according to weight ratio;

S2. the weighed metal raw materials were added in batches to a smelting furnace for melting to obtain a molten aluminum liquid;

The S2 comprised the following steps:

S21. the pure aluminum ingot was added to the smelting furnace, and then the temperature in the smelting furnace was raised to 680° C., and the temperature in the smelting furnace was maintained until all the pure aluminum ingot was melted;

S22. the temperature in the smelting furnace was raised to 720° C.-750° C., and then Si4410 industrial silicon, Al—Mn intermediate alloy, Al—V intermediate alloy, Al—Zr intermediate alloy and Al—Sr intermediate alloy were added, and the temperature in the smelting furnace was maintained until all the intermediate alloy and Si4410 industrial silicon were melted;

S23. the temperature in the smelting furnace was reduced to 700° C.-730° C., and then the pure magnesium ingot was pressed into the melt and the temperature in the smelting furnace was maintained until the pure magnesium ingot was completely melted.

S3. after all the metals in the molten aluminum liquid had melted, the temperature in the liquid was maintained between 700° C. to 730° C. and the molten aluminum liquid was allowed to stand still for 10 min and analyzed whether its chemical composition met the requirements; if so, it was proceeded to step S5; if not, it was proceeded to step S4;

S4. the composition adjustment plan and materials were determined based on the analysis of the chemical composition, and then it was proceeded to step S2;

S5. argon gas was injected into the molten aluminum liquid at a flow rate of 18 L/min and 6 kg of solid refining agent was added to refine for 10 min. Slag and gas removal treatment was carried out on the molten aluminum liquid, and then surface scum was removed to complete the preliminary refining, and the preliminarily refined molten aluminum liquid was injected into a transfer ladle with 1 ton of capacity;

S6. after the surface scum of the aluminum liquid was removed, 5 kg of AlTi5B1 refining agent was added, which was pressed into the melt and stirred for 1 min to melt it. Then, nitrogen and 150 g of solid refining agent was injected at a flow rate of 25 L/min and then the rotary refining and degassing was carried out for 5 min with a speed of 500 r/min, and then slag removal was carried out to obtain the refined aluminum liquid;

S7. quality testing was conducted on the refined aluminum liquid to determine whether it met the quality requirements; if so, it was proceeded to step S9; if not, it was proceeded to step S8;

S8. the quality adjustment plan and materials were determined based on the quality testing, and then it was proceeded to step S2;

S9. die casting was carried out under the conditions of aluminum liquid set temperature of 690° C., casting pressure of 80 MPa, demolding agent ratio of 1:80, mold temperature of 200° C., and vacuum degree of 30-40 mbar to obtain the high strength and toughness die-casting aluminum alloy products without heat treatment and the primary return charges.

As shown in FIGS. 1 to 3, the high strength and toughness die-casting aluminum alloy without heat treatment prepared from the above-mentioned components had an α-Al with the average grain size of no more than 20 μm, and a silicon phase with the average grain size of no more than 1 μm. According to the principle of fine grain strengthening, the finer the grain size, the stronger and toughness of the material could be simultaneously enhanced, thereby ensuring that the die-casting aluminum alloy could have higher strength and toughness.

EXAMPLE 2

The percentage by weight of each component in the high strength and toughness die-casting aluminum alloy without heat treatment was: Silicon: 9.0 wt. %; Magnesium: 0.006 wt. %; Manganese: 0.5 wt. %; Titanium: 0.03 wt. %; Strontium: 0.022 wt. %; Vanadium: 0.024 wt. %; Zirconium: 0.014 wt. %, iron: 0.1 wt. %. Each of the other unavoidable impurity elements was no more than 0.05 wt. %, and the sum of the other unavoidable impurity elements was no more than 0.25 wt. %, and the rest was aluminum. The grade of the aluminum alloy prepared by using this component was HTDA02.

This method for preparing the high strength and toughness die-casting aluminum alloy without heat treatment comprised the following steps:

S1. Al99.80 aluminum ingot, Si4410 industrial silicon, pure magnesium ingot, Al—Mn intermediate alloy, Al—V intermediate alloy, Al—Zr intermediate alloy, Al—Sr intermediate alloy, and Al—Ti—B intermediate alloy were weighed according to weight ratio;

S2. the weighed metal raw materials were added in batches to a smelting furnace for melting to obtain a molten aluminum liquid;

The S2 comprised the following steps:
S21. the pure aluminum ingot was added to the smelting furnace, and then the temperature in the smelting furnace was raised to 680° C., and the temperature in the smelting furnace was maintained until all the pure aluminum ingot was melted;
S22. the temperature in the smelting furnace was raised to 720° C.-750° C., and then Si4410 industrial silicon, Al—Mn intermediate alloy, Al—V intermediate alloy, Al—Zr intermediate alloy and Al—Sr intermediate alloy were added, and the temperature in the smelting furnace was maintained until all the intermediate alloy and Si4410 industrial silicon were melted;
S23. the temperature in the smelting furnace was reduced to 700° C.-730° C., and then the pure magnesium ingot was pressed into the melt and the temperature in the smelting furnace was maintained until the pure magnesium ingot was completely melted.
S3. after all the metals in the molten aluminum liquid had melted, the temperature in the liquid was maintained between 700° C. to 730° C. and the molten aluminum liquid was allowed to stand still for 10 min and analyzed whether its chemical composition met the requirements; if so, it was proceeded to step S5; if not, it was proceeded to step S4;
S4. the composition adjustment plan and materials were determined based on the analysis of the chemical composition, and then it was proceeded to step S2;
S5. argon gas was injected into the molten aluminum liquid at a flow rate of 18 L/min and 6 kg of solid refining agent was added to refine for 10 min. Slag and gas removal treatment was carried out on the molten aluminum liquid, and then surface scum was removed to complete the preliminary refining, and the preliminarily refined molten aluminum liquid was injected into a transfer ladle with 1 ton of capacity;
S6. after the surface scum of the aluminum liquid was removed, 5 kg of AlTi5B1 refining agent was added, which was pressed into the melt and stirred for 1 min to melt it. Then, nitrogen and 150 g of solid refining agent was injected at a flow rate of 25 L/min and then the rotary refining and degassing was carried out for 5 min with a speed of 500 r/min, and then slag removal was carried out to obtain the refined aluminum liquid;
S7. quality testing was conducted on the refined aluminum liquid to determine whether it met the quality requirements; if so, it was proceeded to step S9; if not, it was proceeded to step S8;
S8. the quality adjustment plan and materials were determined based on the quality testing, and then it was proceeded to step S2;
S9. die casting was carried out under the conditions of aluminum liquid set temperature of 690° C., casting pressure of 80 MPa, demolding agent ratio of 1:80, mold temperature of 200° C., and vacuum degree of 30-40 mbar to obtain the high strength and toughness die-casting aluminum alloy products without heat treatment and the primary return charges.

In addition, the comparison of the chemical composition (the main elements with differences) and mechanical properties of the test bar between the without heat treatment high strength and toughness die-casting aluminum alloys prepared in Example 1 and Example 2 of the present invention and those in the Comparative Example 1, the Comparative Example 2, and the Comparative Example 3 was shown in Tables 1 and 2.

Among them, it was Silafont 36 (AlSi10MnMg aluminum alloy) alloy in the Comparative Example 1, and Silafont 36 alloy and AlSi10MnMg aluminum alloy were the same substance. AlSi10MnMg was the EU aluminum alloy brand, which was a heat treatable and strengthened die-casting alloy disclosed in U.S. Pat. No. 6,364,970 B1.

It was C611 alloy in the Comparative Example 2, and the C611 aluminum alloy material was a type of materials without heat treatment developed by Aluminum Company of America for large die castings. It was other V and Zr element content combinations of the present invention with non-optimal mechanical properties in the Comparative Example 3. The methods for preparing three types of materials were consistent with those in the examples.

TABLE 1

Chemical Composition of Die-Casting Aluminum Alloy (Main Elements with Differences) in wt. %

| Group | Characteristics/Brand | Si | Mg | Mn | Ti | Sr | V | Zr |
|---|---|---|---|---|---|---|---|---|
| Ex. 1 | The present invention/HTDA02plus | 9.0 | 0.22 | 0.5 | 0.03 | 0.022 | 0.024 | 0.014 |
| Ex. 2 | Modification of the present invention/HTDA02 | 9.0 | 0.006 | 0.5 | 0.03 | 0.022 | 0.024 | 0.014 |
| Com. Ex. 1 | Silafont 36/AlSi10MnMg | 10.5 | 0.33 | 0.45 | 0.06 | 0.018 | — | — |
| Com. Ex. 2 | C611 | 7.5 | 0.26 | 0.54 | 0.07 | 0.019 | — | — |
| Com. Ex. 3 | Other experiments of the present invention | 9.0 | 0.006 | 0.5 | 0.04 | 0.021 | 0.22 | 0.21 |

TABLE 2

Mechanical Properties of Die-Casting Aluminum Alloy

| Group | Characteristics/Brand | Tensile Strength/MPa | Yield Strength/MPa | Elongation/% |
|---|---|---|---|---|
| Ex. 1 | The present invention/HTDA02plus | 284.41 | 120.46 | 15.50 |
| Ex. 2 | Modification of the present invention/HTDA02 | 263.17 | 116.48 | 16.85 |
| Com. Ex. 1 | Silafont 36/AlSi10MnMg | 319.11 | 151.20 | 9.76 |
| Com. Ex. 2 | C611 | 255.23 | 109.29 | 11.31 |
| Com. Ex. 3 | Other experiments of the present invention | 272.60 | 122.84 | 13.66 |

According to the data from the Examples and Comparative Examples in Tables 1 and 2 above, it can be seen that by adding V and Zr to strengthen the die-casting aluminum alloy and adding Al—Ti—B as a refining agent, it not only ensures good die-casting performance, but also has the best comprehensive mechanical properties and lower cost.

Except for the Sr content, there is little research on the influence of alloy elements with content below 0.1 wt. % on aluminum alloys, and content below 0.05 wt. % is even considered as other elements in the production process. The present invention investigated the effect of low content V and Zr elements on the properties of the high strength and toughness aluminum alloys, and proved that the addition of trace amounts (≤0.1 wt. %) of these two elements could also have a significant impact on the properties of aluminum alloys.

The present invention relates to a high strength and toughness die-casting aluminum alloy without heat treatment, and a preparation method and article thereof. The material performance is excellent, and the preparation process is convenient. By accurately designing the composition of the aluminum alloy material, the prepared aluminum alloy can have a good balance in strength, elongation, flowability and so on, and its comprehensive performance is superior to existing die-casting aluminum alloy materials. The aluminum alloy castings produced by the present invention can avoid deformation caused by the heat treatment process, not only reducing the scrap rate of casting products, but also saving energy consumption during the heat treatment, thereby achieving the effects of energy conservation and emission reduction. By using the same level recycling of the primary return charge, the utilization rate of the material is improved, and the production cost is further reduced, which has excellent economic benefits and promotion value.

Those skilled in the art can easily understand that the above are only preferred embodiments of the present invention and are not intended to limit it. Any modifications, equivalent substitutions, and improvements made within the spirit and principles of the present invention should be included within the scope of protection of the present invention.

What is claimed is:

1. A die-casting aluminum alloy having copper and zinc elements without a heat treatment, comprising the following components in percentage by mass: 7.0 wt. %-10.0 wt. % of silicon, no more than 0.05 wt. % of copper, no more than 0.006 wt. % of magnesium, 0.3 wt. %-0.7 wt. % of manganese, 0.1 wt. %-0.2 wt. % of iron, no more than 0.07 wt. % of zinc, 0.03 wt. %-0.2 wt. % of titanium, 0.015 wt. %-0.03 wt. % of strontium, 0.02 wt. %-0.05 wt. % of vanadium, 0.01 wt. %-0.05 wt. % of zirconium, no more than 0.05 wt. % of each of unavoidable impurity elements; wherein a sum of the unavoidable impurity elements is no more than 0.25 wt. %, and a rest is aluminum; and a ratio of the percentage by mass of the vanadium to the percentage by mass of the zirconium is 1.2:1 to 2.4:1, wherein an as-cast tensile strength of the die-casting aluminum alloy is in a range between 270 MPa and 300 MPa, an as-cast yield strength of the die-casting aluminum alloy is in a range between 120 MPa and 150 MPa, and an as-cast elongation of the die-casting aluminum alloy is in a range between 11% and 16%.

2. The die-casting aluminum alloy having the copper and zinc elements without the heat treatment according to claim 1, wherein the die-casting aluminum alloy comprises the following components in the percentage by mass: 8.5 wt. %-9.5 wt. % of the silicon, no more than 0.05 wt. % of the copper, no more than 0.006 wt. % of the magnesium, 0.45 wt. %-0.55 wt. % of the manganese, 0.1 wt. %-0.2 wt. % of the iron, no more than 0.07 wt. % of the zinc, 0.03 wt. %-0.2 wt. % of the titanium, 0.015 wt. %-0.03 wt. % of the strontium, 0.02 wt. %-0.05 wt. % of the vanadium, and 0.01 wt. %-0.05 wt. % of the zirconium; each of the unavoidable impurity elements is no more than 0.05 wt. %, the sum of the unavoidable impurity elements is no more than 0.25 wt. %, and the rest is the aluminum.

3. A method for preparing the die-casting aluminum alloy having the copper and zinc elements without the heat treatment according to claim 1, comprising the following steps:

S1) weighing an aluminum raw material, a silicon raw material, a magnesium raw material, an Al—Mn intermediate alloy, an Al—V intermediate alloy, an Al-Zr intermediate alloy, an Al—Sr intermediate alloy, and an Al—Ti—B intermediate alloy according to a weight ratio;

S2) adding weighed metal raw materials in batches to a smelting furnace for melting to obtain a molten aluminum liquid;

S3) after the weighed metal raw materials in the molten aluminum liquid have melted, allowing the molten aluminum liquid to stand still and analyzing whether a chemical composition of the molten aluminum liquid meets a requirement; if so, proceeding to step S5; if not, proceeding to step S4;

S4) determining a composition adjustment plan and materials based on an analysis of the chemical composition, and then proceeding to step S2;

S5) conducting a preliminary refinement of the molten aluminum liquid and injecting a preliminarily refined molten aluminum liquid into a transfer ladle;

S6) conducting a secondary refinement of the preliminarily refined molten aluminum liquid in the transfer ladle, and adding the Al—Ti—B intermediate alloy in a powder state to obtain a refined aluminum liquid;

S7) conducting a quality testing on the refined aluminum liquid to determine whether the refined aluminum liquid meets a quality requirement; if so, proceeding to step S9; if not, proceeding to step S8;

S8) determining a quality adjustment plan and materials based on the quality testing, and then proceeding to step S2;

S9) injecting the refined aluminum liquid into a die-casting machine for a die-casting to obtain a die-casting aluminum alloy article without the heat treatment and a primary return charge.

4. The method for preparing the die-casting aluminum alloy having the copper and zinc elements without the heat treatment according to claim 3, wherein S2 comprises the following steps:

S21) adding the aluminum raw material to the smelting furnace, then raising a temperature in the smelting furnace to 680° C., and maintaining the temperature in the smelting furnace until the aluminum raw material is melted;

S22) raising the temperature in the smelting furnace to 720° C.-750° C., then adding the silicon raw material, the Al—Mn intermediate alloy, the Al—V intermediate alloy, the Al—Zr intermediate alloy, and the Al—Sr intermediate alloy, and maintaining the temperature in the smelting furnace until the Al—Mn intermediate alloy, the Al—V intermediate alloy, the Al—Zr intermediate alloy, the Al—Sr intermediate alloy, and the silicon raw material are melted to obtain a melt;

S23) reducing the temperature in the smelting furnace to 700° C.-730° C., then pressing the magnesium raw material into the melt and maintaining the temperature in the smelting furnace until the magnesium raw material is completely melted.

5. The method for preparing the die-casting aluminum alloy having the copper and zinc elements without the heat treatment according to claim 3, wherein the aluminum raw material is one or more of pure aluminum or aluminum ingots with a quality not lower than Al99.80 grade for remelting, and/or the silicon raw material is one or more of pure silicon or industrial silicon with a quality not lower than Si4410 grade.

6. The method for preparing the die-casting aluminum alloy having the copper and zinc elements without the heat treatment according to claim 3, wherein in S2, the primary return charge not exceeding 30% of a total aluminum demand weight is added.

7. The method for preparing the die-casting aluminum alloy having the copper and zinc elements without the heat treatment according to claim 3, wherein in S9, the refined aluminum liquid in the transfer ladle is transferred to a holding furnace located on a side of the die-casting machine for an insulation.

8. A die-casting aluminum alloy article having copper and zinc elements without a heat treatment, wherein the die-casting aluminum alloy article comprises the die-casting aluminum alloy having the copper and zinc elements without the heat treatment according to claim 1; or
at least a portion of the-die-casting aluminum alloy article is obtained by reprocessing the die-casting aluminum alloy having the copper and zinc elements without the heat treatment according to claim 1.

9. The method for preparing the die-casting aluminum alloy having the copper and zinc elements without the heat treatment according to claim 3, wherein the die-casting aluminum alloy comprises the following components in the percentage by mass: 8.5 wt. %-9.5 wt. % of the silicon, no more than 0.05 wt. % of the copper, 0.2 wt. %-0.3 wt. % of the magnesium, 0.45 wt. %-0.55 wt. % of the manganese, 0.1 wt. %-0.2 wt. % of the iron, no more than 0.07 wt. % of the zinc, 0.03 wt. %-0.2 wt. % of the titanium, 0.015 wt. %-0.03 wt. % of the strontium, 0.02 wt. %-0.05 wt. % of the vanadium, and 0.01 wt. %-0.05 wt. % of the zirconium; each of the unavoidable impurity elements is no more than 0.05 wt. %, the sum of the unavoidable impurity elements is no more than 0.25 wt. %, and the rest is the aluminum.

10. The method for preparing the die-casting aluminum alloy having the copper and zinc elements without the heat treatment according to claim 4, wherein in S2, the primary return charge not exceeding 30% of a total aluminum demand weight is added.

11. The method for preparing the die-casting aluminum alloy having the copper and zinc elements without the heat treatment according to claim 5, wherein in S2, the primary return charge not exceeding 30% of a total aluminum demand weight is added.

12. The method for preparing the die-casting aluminum alloy having the copper and zinc elements without the heat treatment according to claim 4, wherein in S9, the refined aluminum liquid in the transfer ladle is transferred to a holding furnace located on a side of the die-casting machine for an insulation.

13. The method for preparing the die-casting aluminum alloy having the copper and zinc elements without the heat treatment according to claim 5, wherein in S9, the refined aluminum liquid in the transfer ladle is transferred to a holding furnace located on a side of the die-casting machine for an insulation.

14. The die-casting aluminum alloy article having the copper and zinc elements without the heat treatment according to claim 8, wherein the die-casting aluminum alloy comprises the following components in the percentage by mass: 8.5 wt. %-9.5 wt. % of the silicon, no more than 0.05 wt. % of the copper, no more than 0.006 wt. % of the magnesium, 0.45 wt. %-0.55 wt. % of the manganese, 0.1 wt. %-0.2 wt. % of the iron, no more than 0.07 wt. % of the zinc, 0.03 wt. %-0.2 wt. % of the titanium, 0.015 wt. %-0.03 wt. % of the strontium, 0.02 wt. %-0.05 wt. % of the vanadium, and 0.01 wt. %-0.05 wt. % of the zirconium; each of the unavoidable impurity elements is no more than 0.05 wt. %, the sum of the unavoidable impurity elements is no more than 0.25 wt. %, and the rest is the aluminum.

15. A die-casting aluminum alloy article having copper and zinc elements without a heat treatment, comprising die-casting aluminum alloy having copper and zinc elements without a heat treatment prepared by the method for preparing the die-casting aluminum alloy having the copper and zinc elements without the heat treatment according to claim 3; or
at least a portion of the die-casting aluminum alloy article is obtained by reprocessing the die-casting aluminum alloy having the copper and zinc elements without the heat treatment prepared by the method for preparing the die-casting aluminum alloy having the copper and zinc elements without the heat treatment according to claim 3.

16. The die-casting aluminum alloy article having the copper and zinc elements without the heat treatment according to claim 15, wherein S2 of the method for preparing the die-casting aluminum alloy having the copper and zinc elements without the heat treatment comprises the following steps:
S21) adding the aluminum raw material to the smelting furnace, then raising a temperature in the smelting furnace to 680° C., and maintaining the temperature in the smelting furnace until the aluminum raw material is melted;
S22) raising the temperature in the smelting furnace to 720° C.-750° C., then adding the silicon raw material, the Al—Mn intermediate alloy, the Al—V intermediate alloy, the Al—Zr intermediate alloy, and the Al—Sr intermediate alloy, and maintaining the temperature in the smelting furnace until the Al—Mn intermediate alloy, the Al—V intermediate alloy, the Al—Zr intermediate alloy, the Al—Sr intermediate alloy, and the silicon raw material are melted to obtain a melt;
S23) reducing the temperature in the smelting furnace to 700° C.-730° C., then pressing the magnesium raw material into the melt and maintaining the temperature in the smelting furnace until the magnesium raw material is completely melted.

17. The die-casting aluminum alloy article having the copper and zinc elements without the heat treatment according to claim 15, wherein in the method for preparing the die-casting aluminum alloy having the copper and zinc elements without the heat treatment, the aluminum raw material is one or more of pure aluminum or aluminum ingots with a quality not lower than Al99.80 grade for remelting, and/or the silicon raw material is one or more of pure silicon or industrial silicon with a quality not lower than Si4410 grade.

18. The die-casting aluminum alloy article having the copper and zinc elements without the heat treatment according to claim 15, wherein in S2 of the method for preparing the die-casting aluminum alloy having the copper and zinc elements without the heat treatment, the primary return charge not exceeding 30% of a total aluminum demand weight is added.

19. The die-casting aluminum alloy article having the copper and zinc elements without the heat treatment according to claim 15, wherein in S9 of the method for preparing the die-casting aluminum alloy having the copper and zinc elements without the heat treatment, the refined aluminum liquid in the transfer ladle is transferred to a holding furnace located on a side of the die-casting machine for an insulation.

20. A die-casting aluminum alloy having copper and zinc elements without a heat treatment comprising the following components in the percentage by mass: 9.0 wt. % of silicon, 0.05 wt. % of copper, 0.006 wt. % of magnesium, 0.5 wt. % of manganese, 0.1 wt. % of iron, 0.07 wt. % of zinc, 0.03 wt. % of titanium, 0.022 wt. % of strontium, 0.024 wt. % of vanadium, 0.014 wt. % of zirconium, no more than 0.05 wt. % of each of unavoidable impurity elements; wherein a sum of the unavoidable impurity elements is no more than 0.25 wt. %, and a rest is aluminum; and a ratio of the percentage by mass of the vanadium to the percentage by mass of the zirconium is 1.7:1, wherein an as-cast tensile strength of the die-casting aluminum alloy is in a range between 270 MPa and 300 MPa, an as-cast yield strength of the die-casting aluminum alloy is in a range between 120 MPa and 150 MPa, and an as-cast elongation of the die-casting aluminum alloy is in a range between 11% and 16%.

* * * * *